Patented July 18, 1939

2,166,540

UNITED STATES PATENT OFFICE 2,166,540

ALCOHOLIC TREATMENT OF LIGNEOUS CELLULOSIC MATERIAL

Alan J. Bailey, St. Paul, Minn., assignor to Regents of the University of Minnesota, Minneapolis, Minn., a corporation of Minnesota No Drawing. Application December 17, 1937, Serial No. 180,331

10 Claims. (Cl. 92—9)

This invention relates to the treatment of lignified plant material such as deciduous and coniferous woods, straws, grasses, and other forms of lignified cellulosic materials by the use of aqueous alcoholic liquor containing moderately or strongly basic substances. More particularly, the invention relates to the extractive digestion of lignified plant material and the separation and recovery of the cellulosic and non-cellulosic constituents by the use of alkaline alcoholic solutions.

Heretofore it has been proposed to treat lignified plant materials with organic reactants and reactant mixtures containing various aliphatic and aromatic alcohols in order to remove the lignin and minimize chemical changes in the cellulose and non-cellulosic materials. By treatment with these reagents it has been possible to effect a partial separation of the cellulosic constituent from the non-cellulosic portion although additional treatment is necessary to separate the extracted material from the treating substances. Most of the organic reactants and reactant mixtures heretofore suggested such, for example, methyl alcohol, ethyl alcohol and glycerin, either alone or in combination with other organic reagents known in the art, are miscible in all proportions with water at the normal and at the cooking temperatures. As a result, the waste liquor contains the extracted material in uniform dispersion or solution from which it is difficult and expensive to recover the alcohol or a suitable alcohol-water mixture for re-use in the digestive process. Dilution of the waste liquor with water for the purpose of removing the alcohol-soluble material results in a dilute waste liquor which is expensive to treat in order to recover the alcohol for re-use.

In order to isolate more readily the non-cellulosic products from the cellulosic material and to provide a resultant liquor which may be conditioned for re-use, certain aqueous alcoholic solutions such as n-butyl and n-amyl alcohol aqueous solutions have been suggested for use in treating lignified cellulosic material (U. S. Patent 2,037,001) since these alcohols are, to a large extent, immiscible with water at normal or room temperature and miscible in water at cooking temperatures. When aqueous solutions of these alcohols are cooled to room temperature after the cooking process is completed, an immiscible layer of alcohol separates containing the ligneous extractive. The application of this method of treatment for removal and isolation of the cellulosic and non-cellulosic constituents has been limited (1) due to the expense and difficulty in effecting the separation of the dissolved ligneous extractive so that the alcohol may be recovered for re-use, (2) because of the difficulty in preventing the precipitation of the ligneous extractive upon the cellulosic pulp, unless precautionary measures are taken during the cooling of the liquor, (3) because the difficulty in reconditioning the alcohol for re-use in the process renders it impractical and expensive in a re-cycling system, and (4) because when used with coniferous woods approximately one-fourth to one-fifth of the lignin remained unextracted.

These disadvantages, inherent in the known methods of alcoholic separation and extraction of ligneous materials from lignified plant materials and the preparation of pure cellulose in an unaltered form, are overcome in the present invention by the employment of moderately to strongly basic substances such as lithium hydroxide, potassium hydroxide, sodium hydroxide, or ammonium hydroxide in conjunction with water and an alcohol selected in accordance with its solubility characteristic. Incorporation of basic substances with the alcohol-water mixture serves the double function of aiding in the splitting of the resistant lignin such as that found in coniferous woods, from the carbohydrate and of solubilizing all of the separated lignin in the aqueous liquor. The use of these reagents in the treatment of ligneous plant material results in the establishment of a condition of chemical equilibrium at the digestion temperature between the water, the alcohol, the basic substances and the basic alcoholate by virtue of which the improved process and new compositions of matter are attained.

The present invention has for a purpose the provision of an improved process for preparing purified cellulose by removal of ligneous material from lignified plant materials by use of alcohols which form homogeneous mixtures with water and moderate or strong bases at temperatures suitable for digestion, and which separate into immiscible layers upon cooling after the completion of digestion.

Another object of this invention is to provide an improved process for the separation of the cellulosic and non-cellulosic constituents from lignified plant material by the use of an alcohol and an inorganic basic substance whereby there separates from the cooled digestion mixture an immiscible layer of relatively pure alcohol which may be re-used without further purification in carrying on the process.

Another object of this invention is to provide an improved process wherein an accelerated extractive process is conducted to the removal of ligneous material and to split the resistant lignin-cellulose complexes such as have been found to characterize coniferous woods so that substantially all lignin is easily and quickly removed.

Another object of this invention is to provide an improved process employing an alcoholic treatment for the separation of cellulose and non-cellulosic substances from lignified plant materials which may be carried out on a cyclic basis with economy of time and expense, and whereby the alcoholic constituent may be recovered by mere mechanical separation for re-use in the process.

It is a further object of the invention to provide an improved treatment for the removal of lignin and other non-cellulosic substances from lignified plant material whereby the cooking process may be terminated and the liquor and pulp blown out under cooking pressure or cooled and drained without retention of precipitation of the ligneous extractive on the cellulosic pulp.

In practicing this invention it is necessary to select an alcohol which is reasonably miscible with water at cooking temperatures such, by way of example as 140 degrees C. to 200 degrees C. and which separates into an immiscible layer when cooled to ordinary temperatures such as exist in rooms under normal conditions. It has been found that many of the lower homologues of aliphatic alcohols have essentially the same delignifying action in aqueous solutions. Due to the decreasing solubility in water with increasing length of the carbon chain some alcohols are miscible while others are immiscible with water. In consideration of the normal monohydric saturated alcohols, it has been found that propanol which has three carbon atoms in a straight chain linkage, is completely miscible in water at room temperatures in all proportions while butanol, which has four carbon atoms, required 12 parts of water and pentanol, which has five carbon atoms, requires 40 parts of water in order to form a solution. In selecting an alcohol for the present process it is therefore seen that normal aliphatic saturated alcohols having four or more carbon atoms in a straight chain linkage have desirable water solubility characteristics, since these alcohols are soluble in water at cooking temperatures but form an immiscible layer when cooled to room temperature. Thus, butanol, isobutanol, pentanol, isopentanol, hexanol, isohexanol and other alcohols of aliphatic, aromatic and heterocyclic series having similar water miscibility characteristics are useful, and it is contemplated that these alcohols should come within the scope of this invention.

The alkaline substances which are added to the selected alcohol and water may be selected from bases which yield hydroxyl-ions in an aqueous medium and which form water-soluble substances with the non-cellulosic substances, such as lithium hydroxide, potassium hydroxide, sodium hydroxide, ammonium hydroxide and the like. The introduction of the alkaline substances in the aqueous alcoholic solution serves in the nature of a catalyst to shorten materially the time necessary for complete delignification of the material and to aid in splitting the lignin-cellulose complexes, such as have been found to characterize coniferous woods, and which are resistant to the action of the alcohol and water in the absence of alkaline substances. In addition, the basic substance serves to make the water rather than the alcohol take up the resulting ligneous extractive. As a result of this reaction, the ligneous extractive is concentrated in the aqueous layer in soluble form when the digestion liquor is allowed to cool and separate into aqueous and alcoholic layers.

By varying the conditions and proportions of the reaction, substantially a complete separation of the alcohol and water is achieved and any slight alcohol remaining in the water layer may be removed by conventional treatment. The extremely small proportion of the ligneous extractives which remains in the alcoholic layer does not interfere with the direct re-use of the alcohol without further processing in the further treatment of raw material. This facilitates repeated cyclic processing, with but little make-up for the alcohol and without expensive purification treatment of the alcohol.

The fact that the lignin and other non-cellulosic constituents of the lignified plant material are resolved in the aqueous layer in soluble form provides many inherent advantages. The delignified cellulose pulp is obtained without contamination from precipitation of ligneous extractive on the pulp during the cooling period without the additional steps of either filtering the liquor from the pulp at or near cooking temperatures and pressure or gradually replacing the withdrawn liquor with fresh alcoholic liquor. In addition, the alcoholic layer which separates contains the starting alcohol in substantially pure form which may be re-used directly without further treatment.

Changes in cooking reagents and conditions give results differing in degree but generally the same in type. The concentration of the aqueous alcoholic solution will depend upon the particular alcohol selected although for any given alcohol the concentration may be varied through quite wide limits. Equal volumes of n-butanol and water have been found to give good results in delignifying not only deciduous woods such as aspen, maple, beech, birch and oak, but also coniferous woods such as jack-pine, Norway pine, white pine, balsam fir, black spruce, and white spruce. An eight per cent n-butanol solution was found to remove considerable quantities of lignin although the rate of reaction is lowered by reduced concentration. The concentration of the basic substance may be varied up to ten per cent of the weight of the n-butanol-water mixture although the preferred concentration is in the nature of 2 to 3 per cent of the weight of the total liquor. The rate of reaction varies with the temperature maintained during the cooking process. Temperatures ranging from 140 degrees C. to 200 degrees C. have proved highly satisfactory and a temperature as low as 100 degrees C. was found to remove some lignin although the lower temperatures materially reduce the speed of reaction. The preferred temperatures range from 158 degrees C. to 185 degrees C. which give satisfactory results when both aspen and jack-pine are treated. The invention is equally applicable to deciduous and coniferous woods, for example aspen and jack-pine were substantially delignified by the use of a liquor composed of 48 to 49 parts of water, 48 to 49 parts of n-butanol and 2 to 3 parts of sodium hydroxide under a pressure of 132 pounds per square inch and a temperature of 158 degrees C. Treatment of jack-pine for an hour yielded 43 per cent of pulp containing 2 to 3 per cent of lignin and the treatment of aspen for fifteen minutes yielded fifty per cent of pulp containing 1 to 2 per cent of lignin.

The cellulosic constituent obtained from the present process may be used for any of the purposes for which commercial wood pulps are used in industry.

The non-cellulosic constituent, including the ligneous material which is contained in the aqueous layer of the digestion liquor may be recovered by removal of the water in any well known manner.

Due to the fact that the reactant alcohol separates in substantially pure form upon cooling of the digestion liquor after the cooking operation, the process of this invention is readily adaptable to a cyclic or continuous process of separating and recovering cellulosic and non-cellulosic constituents from lignified plant materials. Use of the alcohol in its residual form for treatment of additional raw material serves greatly to reduce the cost of the process and makes it competitive with present day commercial digestion processes.

The following examples will serve to illustrate the invention although they should not be considered as limitations thereof since changing the conditions do not fundamentally change the results achieved:

*Example 1*

Eleven grams of finely divided coniferous wood, namely jack-pine sawdust, were placed in a bronze autoclave and 98 ml. of butanol, 98 ml. of water, and 4 grams of sodium hydroxide were added. The autoclave was sealed and heated to 158 degrees C. and this temperature maintained for one hour. It was then allowed to cool to room temperature, the autoclave opened and the pulp filtered from the liquor. The liquor consisted of an alcoholic layer containing the ligneous and soluble carbohydrate extractives. A yield of 43 per cent of light-colored oven-dry pulp substantially free of lignin was obtained, the lignin content being 2.7 per cent.

When the basic substance is omitted from the above example a substantial amount of lignin, namely 12.5 per cent remained in the pulp, even though the heating was continued for eight hours. Equally important is the fact that without the basic substance, the lignin that was extracted remained in the alcoholic layer. A comparison of the results with and without the basic substance, follows:

| | Time of cook | Yield of pulp | Lignin in pulp | Location of ligneous extractive in residue liquor |
|---|---|---|---|---|
| | Hours | Per cent | Per cent | |
| With basic substances. | 1 | 43.0 | 2.7 | In aqueous layer. |
| Without basic substances. | 8 | 41.7 | 12.5 | In alcoholic layer. |

*Example 2*

Same as Example 1 except that finely divided deciduous wood, namely aspen sawdust was used and that the cooking temperature was maintained for only 15 minutes. A yield of 49.8% of nearly pure white oven-dry pulp substantially free of lignin was obtained, the lignin content being 1.2 per cent.

*Example 3*

Same as Example 1 using jack-pine, except that butanol decanted from the waste liquor of a previous cook was used without further processing instead of fresh butanol. A yield of 43.1 per cent of pulp containing 2.7 per cent of lignin was obtained. It resembled the pulp obtained in Example 1 in all details. This constituted the second cycle of a continuous operation.

It is sometimes desirable, though not essential, to wash the moist pulp with water in order to free it of adhering lignin bearing liquor, since this tends to lower the residual lignin content. Lignin does not precipitate during this washing, and the resultant pulp is white and of good commercial quality. The wash water diluent likewise does not affect the operation of the alcoholic and lignin layers. Ammonium hydroxide when used as the basic agent produces some delignifying action and causes the lignin to separate in the aqueous layer.

While I have described in detail the preferred embodiment of my invention, it is to be understood that the details of procedure may be variously modified without departing from the spirit of the invention or the scope of the subjoined claims.

I claim:

1. The process of obtaining relatively pure cellulose from wood which comprises treating said wood with a water solution of a mono-hydroxy alcohol having at least four carbon atoms at least three of which are in a straight chain which is substantially insoluble in water at normal temperatures, but soluble therein at temperatures between 100° C. and 200° C., and an inorganic alkali in an amount from about 2% to about 10%, at temperatures from about 100°C. to about 200°C. thereby to water solubilize substantially all of the non-cellulosic constituents of the wood and thereafter separating the cellulosic constituent of the wood from the solution containing the solubilized non-cellulosic constituent.

2. The process of obtaining relatively pure cellulose from wood which comprises treating said wood with a water solution of a mono-hydroxy alcohol having at least four carbon atoms at least three of which are in a straight chain which is substantially insoluble in water at normal temperatures but soluble therein at temperatures between 100° C. and 200° C., and an inorganic alkali in an amount from about 2% to about 10% at temperatures from about 100° C. to about 200° C. thereby to water solubilize substantially all of the non-cellulosic constituents of the wood, separating the cellulosic constituent of the wood from the solution containing the thus solubilized non-cellulosic constituent, and cooling the thus separated solution to separate the alcohol in substantially uncontaminated form from the water solution of water solubilized non-cellulosic constituents.

3. The process of obtaining relatively pure cellulose from wood which comprises treating said wood with a water solution of a butyl alcohol having at least 3 carbon atoms in a straight chain and from about 2% to about 3% of an inorganic alkali, at a temperature from about 100° C. to about 200° C. thereby to water solubilize substantially all of the non-cellulosic constituents of the wood, and thereafter separating the cellulosic constituents from the solution containing the thus solubilized non-cellulosic constituents.

4. The process of obtaining relatively pure cellulose from wood which comprises treating said wood with a water solution of butanol, and an inorganic alkali in an amount from about 2% to about 10%, at a temperature of from about 100° C. to about 200° C. thereby to water solubilize substantially all of the non-cellulosic constituents of the wood, and thereafter separating the cellulosic constituents from the solution containing the thus solubilized non-cellulosic constituents.

5. The process of obtaining relatively pure cellulose from wood which comprises treating said wood with a water solution of butanol, and sodium hydroxide in an amount from about 2% to about 10%, at a temperature of from about 100° C. to about 200° C. thereby to water solubilize substantially all of the non-cellulosic constituents of the wood, and thereafter separating the cellulosic constituents from the solution containing the thus solubilized non-cellulosic constituents.

6. The process of obtaining relatively pure cellulose from wood which comprises treating said wood with a water solution of a pentyl alcohol, and an inorganic alkali in an amount from about 2% to about 10%, at a temperature of from about 100° C. to about 200° C. thereby to water solubilize substantially all of the non-cellulosic constituents of the wood, and thereafter separating the cellulosic constituents from the solution containing the thus solubilized non-cellulosic constituents.

7. The process of obtaining relatively pure cellulose from wood which comprises treating said wood with a water solution of a hexyl alcohol, and an inorganic alkali in an amount from about 2% to about 10%, at a temperature from about 100° C. to about 200° C. thereby to water solubilize substantially all of the non-cellulosic constituents of the wood, and thereafter separating the cellulosic constituents from the solution containing the thus solubilized non-celulosic constituents.

8. A cyclic process of obtaining relatively pure cellulose from wood which comprises treating said wood with a water solution of a mono-hydroxy alcohol having at least four carbon atoms at least three of which are in a straight chain which is substantially insoluble in water at normal temperatures but soluble therein at temperatures between 100° C. and 200° C., and an inorganic alkali in an amount from about 2% to about 10%, at temperatures from about 100° C. to about 200° C. thereby to water solubilize substantially all of the non-cellulosic constituents of the wood, separating the cellulosic constituents of the wood from the solution containing the thus solubilized non-cellulosic constituent, cooling said solution to separate the alcohol in substantially uncontaminated form from the water solution of water solubilized non-cellulosic constituents and utilizing said substantially uncontaminated alcohol for treatment of another batch of wood in the same manner.

9. A process as set forth in claim 8 wherein the alcohol is butanol.

10. A process as set forth in claim 8 wherein the alcohol is butanol and the inorganic alkali is sodium hydroxide.

ALAN J. BAILEY.